United States Patent [19]
Hashimoto

[11] Patent Number: 6,007,464
[45] Date of Patent: Dec. 28, 1999

[54] TOOL-CHANGING APPARATUS AND METHOD FOR A MACHINE TOOL

[75] Inventor: Narihiko Hashimoto, Nagoya, Japan

[73] Assignee: Brother Kogyo Kabushiki Kaisha, Nagoya, Japan

[21] Appl. No.: 09/123,517

[22] Filed: Jul. 28, 1998

[30] Foreign Application Priority Data

Jul. 30, 1997 [JP] Japan ................................. 9-204733
Aug. 25, 1997 [JP] Japan ................................. 9-228402

[51] Int. Cl.⁶ ................................................. B23Q 3/157
[52] U.S. Cl. ........................... 483/39; 294/103.1; 483/38; 483/44
[58] Field of Search ................... 483/38–46, 49, 483/50, 51, 52, 902; 414/736; 294/101.1

[56] References Cited

U.S. PATENT DOCUMENTS

| | | | |
|---|---|---|---|
| 3,619,898 | 11/1971 | Perry et al. ............................. | 483/48 |
| 3,760,958 | 9/1973 | Lohneis ................................. | 483/44 X |
| 3,786,938 | 1/1974 | Kirkham ................................ | 414/736 |
| 4,117,586 | 10/1978 | Uchida et al. ........................... | 483/41 |
| 4,151,918 | 5/1979 | Nakane ................................. | 414/736 |
| 4,164,809 | 8/1979 | Yamakage ............................... | 483/44 |
| 4,399,603 | 8/1983 | Reed .................................. | 483/41 |
| 4,817,267 | 4/1989 | Hitomi ................................. | 483/44 |
| 4,833,772 | 5/1989 | Kobayashi et al. ...................... | 483/55 |
| 5,081,762 | 1/1992 | Kin ................................... | 483/44 |

FOREIGN PATENT DOCUMENTS

| | | | |
|---|---|---|---|
| 37971 | 4/1978 | Japan ................................. | 483/44 |
| Y2-5-13469 | 4/1993 | Japan . | |

*Primary Examiner*—William Briggs
*Attorney, Agent, or Firm*—Oliff & Berridge, PLC

[57] ABSTRACT

In a tool-changing apparatus for a machine tool, a tool-locking pin and an arm-locking pin are provided in a tool-changing arm and urged upward. When the arm is moved downward by a swinging shaft, the tool-locking pin and the arm-locking pin are moved upward by the urging force of respective springs, and a tapered surface of the tool-locking pin presses an end of a roller shaft projecting from a through-hole of the tool-changing arm, thus preventing a sliding movement of the roller shaft toward the through-hole, and a tapered surface of the arm-locking pin fits in a circular groove formed on the peripheral surface of an arm central shaft coupled with the swinging shaft, thus preventing the rotation of the arm relative to an arm-supporting member. When a tool is mounted into a tool-mounting portion, arm locking is released to enable the arm to move independently of the swinging shaft.

11 Claims, 6 Drawing Sheets

TOOL-CHANGING APPARATUS AND METHOD FOR A MACHINE TOOL

BACKGROUND OF THE INVENTION

1. Field of the Invention

The present invention relates to a tool-changing apparatus and method for exchanging a tool set on a main spindle of a machine tool and a tool set on a tool magazine of the same with each other.

2. Description of Related Art

A machine tool that exchanges a tool set on its main spindle and a tool set on its tool magazine has a tool-changing apparatus. In this machine tool, a gripping portion formed at an end of a tool-changing arm constituting a tool-gripping mechanism grips a tool set on the main spindle and a tool set on the tool magazine, and then the tool-changing arm swings or turns to exchange the two tools with each other by changing the positions of the two tools.

The tool-gripping mechanism is divided into two types depending on the manner of gripping tools. In one type of tool-gripping mechanism, the tool is sandwiched by the tool-gripping portion thereof. In the other type of tool-gripping mechanism, one side of the tool is caught by the tool-gripping portion and then pressingly locked to a tool-mounting portion.

The tool-gripping mechanism of the latter type is disclosed in Japanese Utility Model Publication No. 5-13469. The process of moving the tool-changing arm of the tool-gripping mechanism disclosed in this Japanese publication first swings the tool-changing arm by a predetermined angle from the arm-waiting position to the tool-changing position so that the tool-gripping portion formed at ends of the tool-changing arm grips a tool used and set on the main spindle and a new tool set on the tool magazine. The process then moves the tool-changing arm axially and swings it by 180° at a predetermined position spaced from the tool-changing position to change the positions of the two tools each other. The process moves the tool-changing arm axially to move the tool-changing arm to the tool-changing position so that the tool-changing arm installs the new tool on the main spindle and then releases the tool used from the tool-gripping portion to accommodate it in the tool magazine. The process finally swings the tool-changing arm reversely to return it to the arm-waiting position again.

In this process, the tool-changing arm must be driven reversely in the space between the arm-waiting position and the tool-changing position and the tool-changing arm must be positioned accurately to inset a tool into the main spindle accurately. It is therefore necessary to use a complicated mechanism, namely, to use an expensive roller gear cam having a cam groove formed thereon, or to switch the swinging direction of the tool-changing arm by driving a plurality of gears.

SUMMARY OF THE INVENTION

It is an object of the present invention to provide a tool-changing apparatus which obviates the above drawback.

According to the present invention, a tool-changing apparatus comprises a tool-changing arm having an arm-supporting member having an arm central shaft extending along its axis, and an arm body which is supported by the arm-supporting member such that the arm body is rotatable on the arm central shaft and which has a tool-gripping mechanism. Further, the arm-changing apparatus comprises an arm-locking mechanism for locking and unlocking the arm body relative to the arm central shaft. The arm-locking mechanism, thus locking the tool-changing arm body to the arm-supporting member, the rotation of the tool-changing arm body relative to the arm-supporting member is restricted in order to swing the tool-changing arm and the swinging shaft together.

The tool-changing arm preferably has a tool-locking mechanism for locking and unlocking the a clamping member in addition to the arm-locking mechanism. The tool-gripping portion of the tool-changing arm has the clamping member which is urged to be projected in a predetermined length by the urging force of a spring. When the clamping member contacts the tool owing to the swinging motion of the tool-changing arm, the clamping member is pressed toward the center of the tool-changing arm body by an external force against the urging force of the spring. When the tool passes the leading end of the clamping member in inserting it into the tool-gripping portion, the clamping member is projected by the urging force, thus clamping the tool pressingly in the tool-gripping portion.

Thus, the clamping member is pressed toward the center of the tool-changing arm body when an external force greater than the urging force is applied thereto. Thus, when a centrifugal force is applied to the clamping member owing to the swinging motion of the tool-changing arm, it may occur that the tool may not be held by the clamping member. The arm-locking mechanism however keeps the tool held by the clamping member, because the arm-locking mechanism prevents the sliding movement of the clamping member. Thus, even when the tool-changing arm swings at such a high angular velocity that a great centrifugal force is applied to the clamping member, the tool can be reliably held in the gripping portion.

BRIEF DESCRIPTION OF THE DRAWINGS

Other objects, features and advantages of the present invention will become more apparent from the following detailed description made with reference to the accompanying drawing. In the accompanying drawings.

DETAILED DESCRIPTION OF THE PREFERRED EMBODIMENTS

Figure 1:
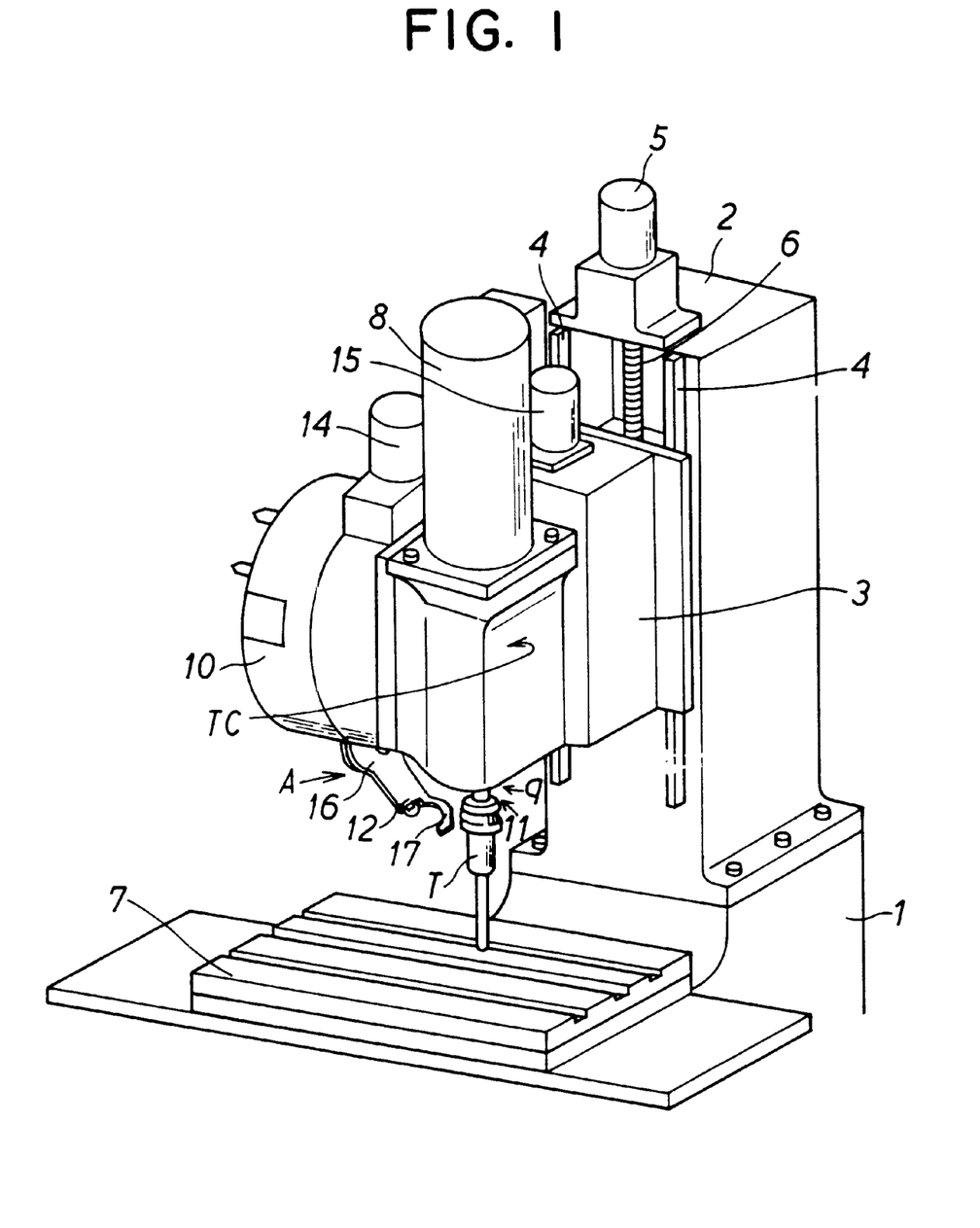
FIG. 1 is a perspective view showing a machine tool embodying a tool-changing apparatus according to an embodiment of the present invention.

Referring first to FIG. 1, a tool-changing apparatus TC according to an embodiment of the present invention is installed on a machine tool or machining center.

In this machining center, as known well in the art such as U.S. Pat. No. 4,833,772 (Japanese Laid-Open Patent Publication No. 63-123646) assigned to the same assignee of the present application, a main spindle head 3 is supported on a column 2 erected on a base 1 and fixed thereto. The main spindle head 3 is vertically movable along a pair of linear guides 4 by the rotation of a feed screw 6 coupled with a Z-axis feed motor 5. A table 7 installed on the base 1 is held movably in a horizontal plane. A main spindle motor 8, a main spindle 9, and a rotary tool magazine 10 are mounted on the main spindle head 3.

The main spindle 9 has a tool-mounting portion 11 capable of removably or detachably holding a tool (T); and a tool release pin (not shown) which is connected with the tool-mounting portion 11 through a draw bar (not shown) and releases the tool (T) from the tool-mounting portion 11 when the release pin is pressed downward.

The tool magazine 10 holds the tool (T) removably or detachably and has a plurality of holding pots on the peripheral surface of a rotary disk thereof, with the holding pots normally placed thereon horizontally. Only the holding pot located at the lowermost position of the rotary disk is rotated 90° downward to allow the holding pot to take a vertical position so that the tool-changing apparatus TC of the embodiment is capable of exchanging the tool (T). The selection of the tool (T), namely, the positioning of the tool (T) at the lowermost position of the rotary disk is made by the rotation of a magazine motor 14.

The main spindle head 3 incorporates the tool-changing apparatus TC for exchanging the tool (T) set on the main spindle 9 and the tool (T) set on the tool magazine 10 with each other. The tool-changing apparatus TC comprises a tool-changing driving motor 15 and a tool-changing arm (A).

Figure 2:
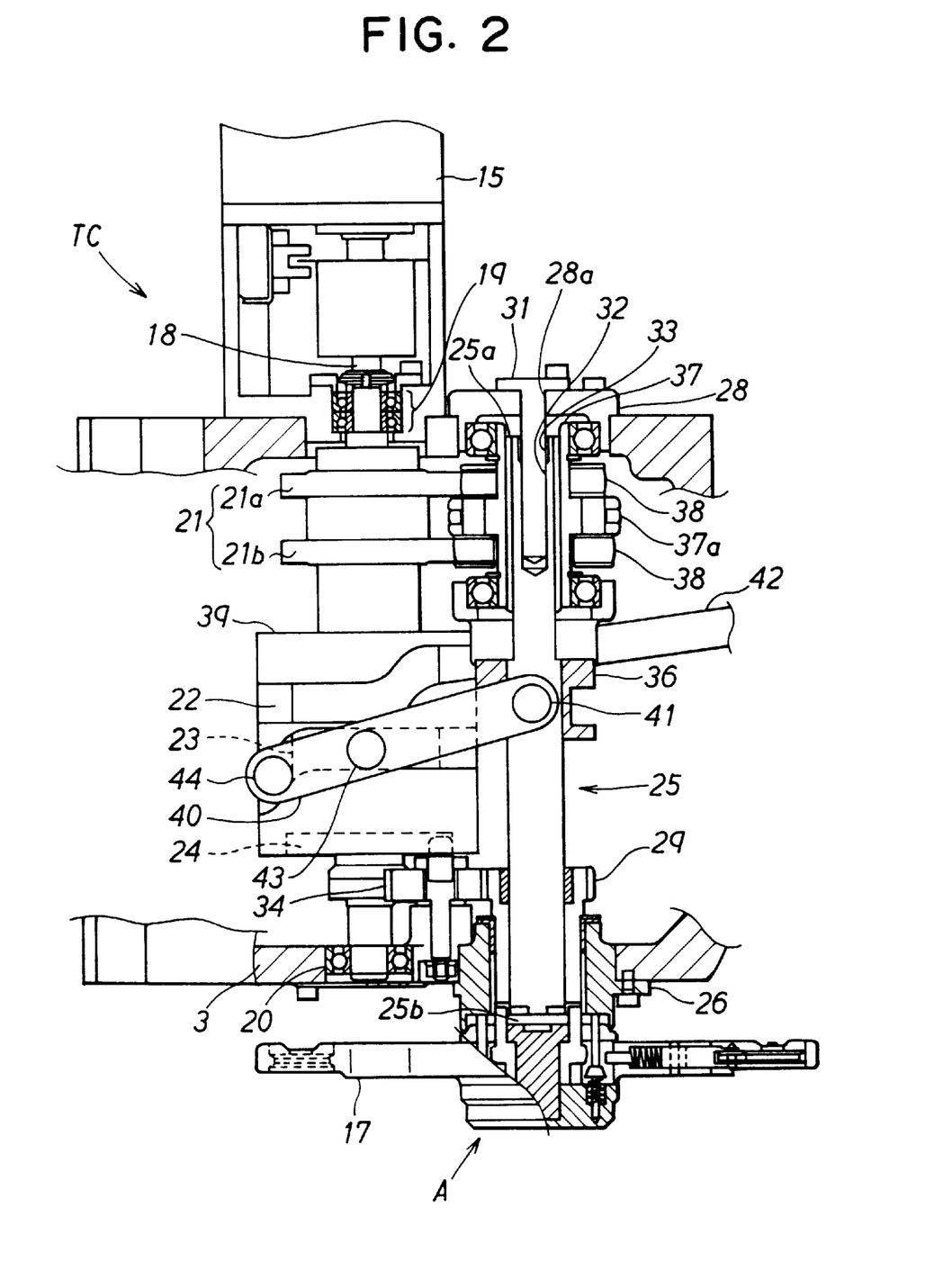
FIG. 2 is a vertical sectional view showing the tool-changing apparatus of the embodiment.
Figure 3:
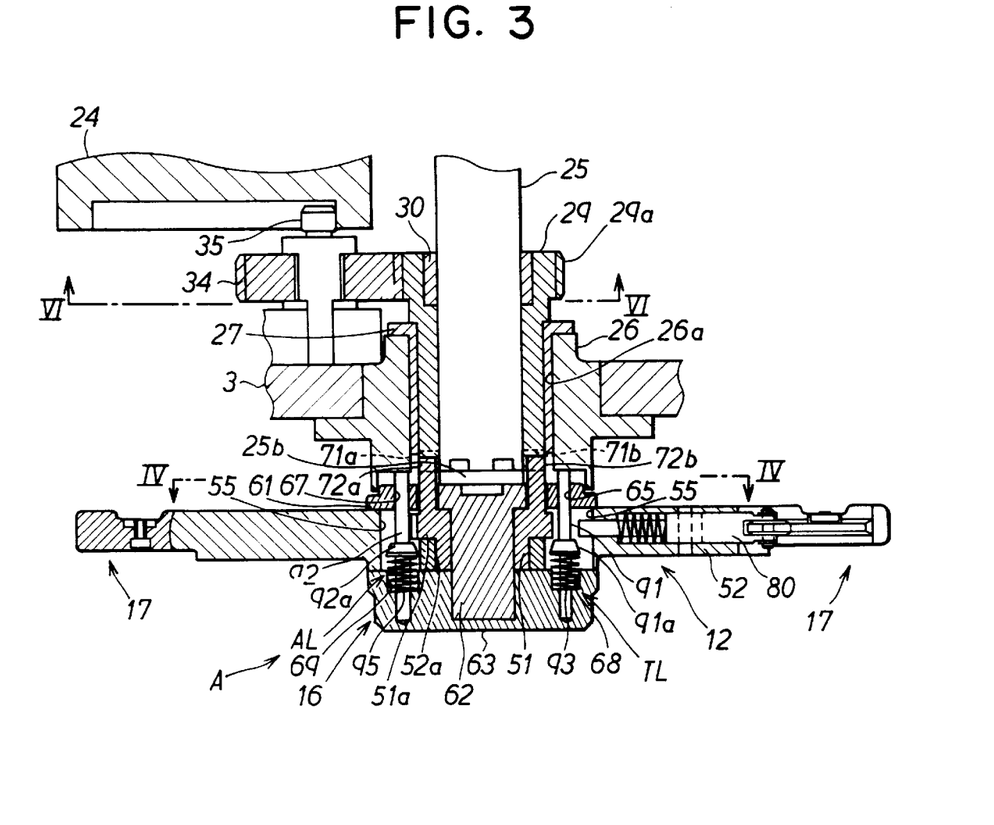
FIG. 3 is an enlarged sectional view showing a tool-gripping mechanism of the embodiment.

The tool-changing arm (A) is shown in detail in FIG. 2 and the tool-gripping mechanism is shown in detail in FIG. 3. The tool-changing arm (A) comprises an arm-supporting member 16 having an arm central shaft 62 extending coaxially with a swinging shaft 25 of the arm tool-changing arm (A); and an arm body 12 which is supported by the arm-supporting member 16 such that the arm body 12 is rotatable on the arm central shaft 62. The arm body 12 has a tool-gripping portion 17, for supporting the tool (T), formed at both ends thereof. In order to exchange the tool (T) set on the main spindle 9 and the tool (T) set on the tool magazine 10 with each other, after the tool-gripping portion 17 grips the tools (T), the tool-changing arm (A) swings and moves upward and downward.

As shown in FIG. 2, an automatic tool-changing (ATC) driving shaft 18 of the tool-changing apparatus TC extending vertically is connected with the tool-changing driving motor 15 and rotatably supported on the main spindle head 3 through bearings 19 and 20. Four cams 21, 22, 23, and 24 are formed on the ATC driving shaft 18.

A swinging shaft 25 is positioned vertically alongside the ATC driving shaft 18. A spline 25a is formed at an upper portion of the swinging shaft 25. A flange 25b is formed at the lowermost end of the swinging shaft 25. The tool-changing arm (A) is fixed to the flange 25b.

There is formed at the upper end of the swinging shaft 25 a step-formed hole 32 having a predetermined depth and extending along the axis of the swinging shaft 25. A cylindrical supporting member 31 having a smaller diameter than the inner diameter of the step-formed hole 32 is inserted into a through-hole 28a formed in an upper mechanical frame 28 of the main spindle head 3. The supporting member 31 is fixed to the upper mechanical frame 28 and inserted into the step-formed hole 32 through a bushing 33 provided at an upper step of the step-formed hole 32, thus supporting the upper part of the swinging shaft 25.

As shown in FIG. 3, the lower end of the swinging shaft 25 penetrates through an annular external gear 29 whose diameter is larger than that of the swinging shaft 25. The swinging shaft 25 is supported such that it is rotatable on its axis and capable of making a reciprocating linear motion along its axis under the guide of the bushing 30 and the external gear 29.

A hole 26a is formed on a lower mechanical frame 26 of the main spindle head 3 such that the external gear 29 penetrates through the hole 26a via a bushing 27 and is rotatable on its axis, independently of the rotation of the swinging shaft 25.

As shown in FIG. 2, the swinging shaft 25 has a cylindrical member 36 which is fixed to the vicinity of the center of the swinging shaft 25 in the vertical direction and which has a circumferential groove thereon. The swinging shaft 25 reciprocates vertically due to the upward and downward movement of the cylindrical member 36. Further, the swinging shaft 25 rotates around its axis owing to the rotation of a spline auxiliary shaft 37 engaging the spline 25a formed at an upper portion thereof. The shaft of a follower roller 38 serving as a cam follower of the cam 21 is fixed to the upper and lower surfaces of a flange 37a formed on the periphery of the spline auxiliary shaft 37.

As shown in FIG. 3, a gear 29a is formed on the upper end of the periphery of the external gear 29 and in mesh with a segment gear 34 positioned alongside the gear 29a. A swinging arm 35 fixed to the segment gear 34 swings along the cam 24.

Recesses 71a and 71b open in the lower part and spaced at 180° are formed on the lower end of the external gear 29. The external gear 29 is in mesh with an arm rotation shaft 51 of the tool-changing arm (A) through the recesses 71a and 71b.

The arm-supporting member 16 has an upper flange 61 formed integrally with the upper part of the arm central shaft 62 and radially extending on the periphery of the arm central shaft 62; and a disc-shaped lower flange 63 fitted in the lower end of the arm central shaft 62. The arm body 12 is rotatably sandwiched between the upper flange 61 and the lower flange 63.

The arm body 12 has, in addition to the annular arm rotation shaft 51 through which the arm central shaft 62 penetrates, a swinging arm 52, the central part of which is fitted in a lower portion of the arm rotation shaft 51 and which has a tool-gripping portion 17 at both ends thereof. The arm rotation shaft 51 has a flange 51a at an upper portion thereof. The arm rotation shaft 51 has, at its upper end, projections 72a and 72b projecting upward in confrontation with the recesses 71a and 71b, respectively formed at the lower end of the external gear 29. The swinging arm 52 has a recess at its center. A through-hole is formed at the center of the recess. In other words, the swinging arm 52 comprises a solid flange 52a formed from the side surface of the recess to the center. The flange 52a which is a part of the arm body 12 is connected with the flange 51a to integrate the arm body 12 with the flange 51a. The arm rotation shaft 51 and the swinging arm 52 may be formed by one-piece molding.

The external gear 29 and the arm body 12 are capable of rotating together by fitting the projections 72a and 72b formed at the upper end of the arm body 12 in the recesses 71a and 71b, respectively formed at the lower end of the external gear 29.

Figure 5:
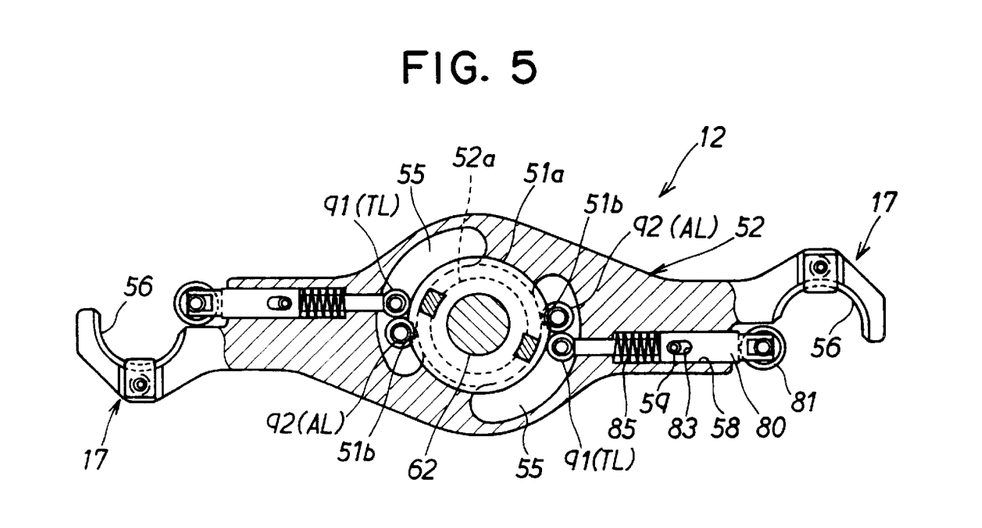
FIG. 5 is a horizontal sectional view showing an arm body of the embodiment.

As shown in FIG. 5, the swinging arm 52 is symmetrical with respect to the arm central shaft 62 and has the tool-gripping portions 17 and 17 which are formed at both ends of the swinging arm 52 and which have tool contact portions 56 and 56 facing in opposite directions.

Two arcuate through-holes 55 and 55 symmetrical with respect to the center of the swinging arm 52 are formed on the periphery of the flange 52a formed at the center of the swinging arm 52. A tool-locking pin 91 and an arm-locking pin 92 are vertically inserted into each of the through-holes 55 such that the tool-locking pin 91 and the arm-locking pin 92 can be rotated at a predetermined angle, respectively inside each of the through-holes 55.

There is provided inside the arm body 12 a step-formed insertion hole 58 which is adjacent to the side surface (lower side in FIG. 5) thereof at which the tool contact portion 56 is positioned and which extends between the through-holes 55 and the tool-gripping portion 17. The stepped portion of the step-formed insertion hole 58 becomes smaller from the center of the arm body 12 toward the through-hole side. A roller shaft 80 serving as a tool-clamping member is inserted into the step-formed insertion hole 58. The roller shaft 80 has a roller 81 rotatably supported at one end thereof to lock the tool (T) on the tool contact portion 56 by pressing the tool (T) against the tool contact portion 56 when the tool (T) is in contact therewith. The roller shaft 80 which is circular rod-shaped has at its center a stepped portion which becomes smaller toward the through-hole 55, thus penetrating slidably through the step-formed insertion hole 58. An elliptic slot 83 is formed at the center of the roller shaft 80. An orthogonal pin 59 fixed to the swinging arm 52 is inserted into the slot 83 to prevent the roller shaft 80 from rotating on its axis. A spring 85 is resiliently interposed between the stepped portion of the step-formed insertion hole 58 and that of the roller shaft 80, thus urging the roller shaft 80 toward the gripping portion-positioned side.

Figure 4:
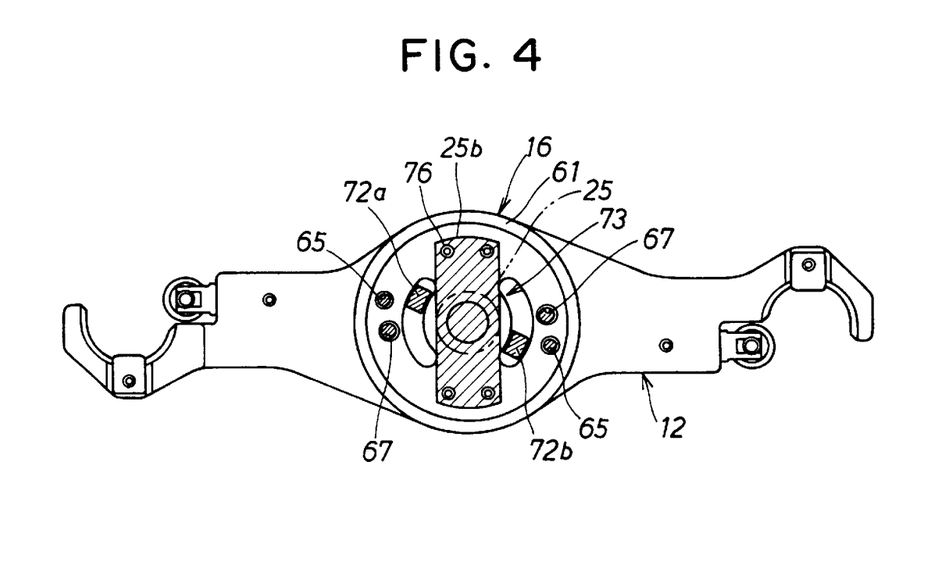
FIG. 4 is a horizontal sectional view taken along a line IV—IV in FIG. 3.

As understood from FIGS. 3 and 4, the flange 25b connecting the swinging shaft 25 and the arm-supporting member 16 with each other has a shape formed by cutting off opposed portions of a disk parallelly. The center of the upper surface of the flange 25b is connected with the lower surface of the swinging shaft 25. The lower surface of the flange 25b is connected with the upper surface of the arm-supporting member 16 by means of pins 76 at two positions located in the vicinity of the circumference of the flange 25b and the arm-supporting member 16. The positions at which the projections 72a and 72b are fitted in the recesses 71a and 71b, respectively are located a little upward from the upper surface of the flange 25b. As will be described later, the rotational motion of the swinging shaft 25 and that of the arm-supporting member 16 are made by moving both downward, with the projections 72a and 72b being unfitted in each of the recesses 71a and 71b. On the other hand, the rotating motion of the arm rotation shaft 51 and that of the external gear 29 are made by moving the swinging shaft 25 and the arm-supporting member 16 upward, with the arm rotation shaft 51 being in engagement with the external gear 29 through the projections 72a and 72b.

Figure 8:
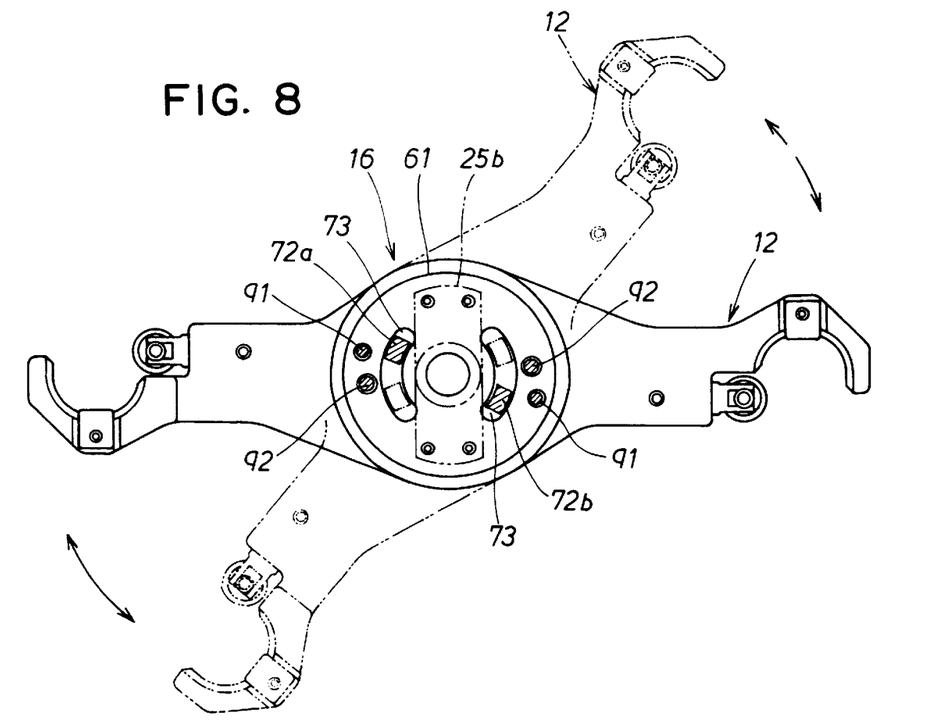
FIG. 8 is a plan view showing a swinging motion of a tool-changing arm between an arm-waiting position and a tool-gripping position in the embodiment.

Referring to FIG. 8 showing the arm body 12 at an arm-waiting position (shown by two-dot chain line) and a tool-changing position (shown by solid line), the projections 72a and 72b rotate at only a predetermined angle in an arcuate through-hole 73 which is formed through the upper flange 61 of the arm-supporting member 16 such that the through-hole 73 is positioned alongside the flange 25b. Thus, the flange 25b does not prevent the rotation of the projections 72a and 72b.

Referring back to FIG. 3, the arm-supporting member 16 has a pair of axially symmetrical tool-looking mechanisms TL for locking the sliding movement of the roller shaft 80 so as to pressingly lock the tool (T) to the tool contact portion 56 by means of the roller 81 provided at the leading end of the roller shaft 80; and a pair of axially symmetrical arm-locking mechanisms AL for locking the arm body 12 to the arm central shaft 62 or unlocking it therefrom. Although in FIG. 3, the tool-locking mechanism TL is positioned at the right side and the arm-locking mechanisms AL is positioned at the left side, with the arm central shaft 62 positioned at the center, one of the tool-locking mechanisms TL and one of the arm-locking mechanisms AL are proximate to each other, as shown in FIG. 5.

In the tool-locking mechanism TL shown in FIGS. 3 and 4 in particular, through-holes 65 symmetrical with respect to the arm central shaft 62 are formed through the upper flange 61 of the arm-supporting member 16. Step-formed insertion holes 68 which become smaller downward are formed on the lower flange 63 such that the step-formed insertion hole 68 at one side is coaxial with the through-hole 65 at one side and the step-formed insertion hole 68 at the other side is coaxial with the through-hole 65 at the other side. The tool-locking pin 91 is vertically inserted into one of the through-holes 55 such that the upper part of the tool-locking pin 91 projects upward from the through-hole 65 and the lower part thereof is located in the step-formed insertion hole 68. A flange 91a having an upward tapered portion is formed at approximately the longitudinal center of the tool-locking pin 91. A spring 93 is resiliently interposed between the upper surface of the stepped portion of the step-formed insertion hole 68 and the bottom surface of the flange 91a, thus urging the tool-locking pin 91 upward. When the tool-locking pin 91 moves upward, the tapered surface of the flange 91a presses one end of the roller shaft 80 projecting from the through-hole 55 of the swinging arm 52, thus preventing the sliding movement of the roller shaft 80 toward the through-hole 55.

In the arm-locking mechanism AL, through-holes 67 symmetrical with respect to the arm central shaft 62 are formed on the upper flange 61 of the arm-supporting member 16. Step-formed insertion holes 69 which become smaller downward are formed in the lower flange 63 such that the step-formed insertion hole 69 at one side is coaxial with the through-hole 67 and the step-formed insertion hole 69 at the other side is coaxial with the through-hole 67 at the other side. As described previously, the arm-locking pin 92 is vertically inserted into one of the through-holes 55 such that the upper part of the arm-locking pin 92 projects upward from the through-hole 67 and the lower part thereof is located in the step-formed insertion hole 69. A flange 92a having an upward tapered portion is formed at approximately the longitudinal center of the arm-locking pin 91. A spring 95 is resiliently interposed between the upper surface of the stepped portion of the step-formed insertion hole 69 and the bottom surface of the flange 92a, thus urging the arm-locking pin 92 upward. When the arm-locking pin 92 moves upward, the tapered surface of the tool locking pin 92 fits in a circular groove 51b (FIG. 5) formed on the peripheral surface of the arm rotation shaft 51, thus locking the rotation of the arm body 12 relative to the arm-supporting member 16.

According to the tool-changing mechanism, after the tool contact portion 56 is brought into contact with the tool (T)

by the swinging motion of the arm body 12, the tool (T) is locked to tool the contact portion 56. The tool exchanging process comprises the steps of swinging the tool-changing arm (A) to the tool-changing position from the arm-waiting position spaced therefrom at a predetermined angle in the swinging plane so that the tool-gripping portion 17 formed at both ends of the tool-changing arm (A) grips a tool (T) used and set on the main spindle 9 and a new tool (T) set on the tool magazine 10 (FIG. 1); moving the tool-changing arm (A) downward and swinging it by 180° to change the positions of the two tools (T) each other; moving the tool-changing arm (A) upward to install the new tool (T) on the main spindle 9 and then releasing the tool (T) used from the tool-gripping portion 17 to accommodate it in the tool magazine 10; and swinging the tool-changing arm (A) reversely to return it to the arm-waiting position.

The operation of each step will be described below in further detail.

As described above, according to the tool-changing apparatus, the tool-changing arm (A) is swung by a predetermined angle to move it from the arm-waiting position to the tool-gripping position at which the tool-changing arm (A) grips the tool (T) and exchanges the tool (T) set on the main spindle 9 and the tool (T) set on the tool magazine with each other; and then it is swung reversely to move it from the tool-changing position to the arm-waiting position. This is because according to the tool-gripping mechanism, the tool contact portion 56 of the tool-changing arm (A) is brought into contact with one side of the tool (T). The member which is concerned with this operation is the plane grooved cam 24 (FIGS. 2 and 3) formed on the lower surface of a cylindrical member 39 located on the periphery of the ATC driving shaft 18.

Figure 6:
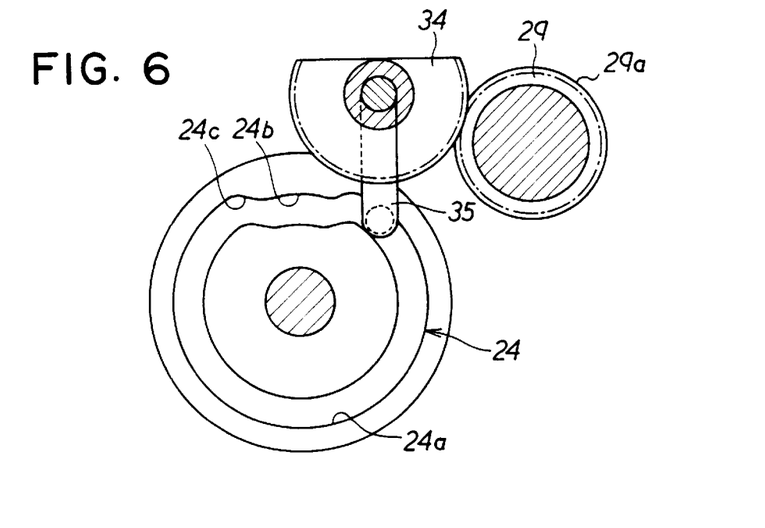
FIG. 6 is a horizontal sectional view taken along a line VI—VI in FIG. 3.

As shown in FIG. 6, the plane grooved cam 24 is closed ring-shaped and has a cam shaft. The plane grooved cam 24 comprises a circular arc-shaped large-diameter portion 24a, a small-diameter portion 24b, and a connection portion 24c connecting the large-diameter portion 24a and the small-diameter portion 24b with each other. The tool-changing arm (A) is at the arm-waiting position, at the tool-changing position or in a swinging state, depending on the position of the swinging arm 35 which engages the large-diameter portion 24a, the small-diameter portion 24b, and the connection portion 24c while the plane grooved cam 24 is rotating.

That is, when the ATC driving shaft 18 has rotated by the predetermined angle, the swinging arm 35 disengages from the large-diameter portion 24a of the plane grooved cam 24. While the swinging arm 35 passes through the connection portion 24c from the large-diameter portion 24a to the small-diameter portion 24b, the swinging arm 35 swings in one direction on the shaft of the segment gear 34. On the other hand, while the swinging arm 35 passes through the connection portion 24c from the small-diameter portion 24b to the large-diameter portion 24a, the swinging arm 35 swings in the direction reversely.

Due to the swinging motion of the swinging arm 35, the segment gear 34 following the swinging motion of the swinging arm 35 rotates. Consequently, the external gear 29 engaging the segment gear 34 through the gear 29a rotates. As a result of the rotation of the external gear 29, the tool-changing arm (A) swings from the arm-waiting position to the tool-changing position or from the tool-changing position to the arm-waiting position, because the upper end of the rotation shaft 51 is in mesh with the lower end of the external gear 29.

The tool-changing arm (A) reciprocates in the axial direction of the swinging shaft 25 to extract the tool (T) from the main spindle 9 or from the tool magazine 10 and clamp it. The member concerned with this operation is the cylindrical grooved cam 23 formed at the upper portion of the peripheral surface of the cylindrical member 39 located on the periphery of the ATC driving shaft 18 (FIG. 2). The swinging lever 40 which swings on a supporting point or fulcrum 44 is in engagement with the cylindrical grooved cam 23 through an engaging member 43 formed proximately to the center of the swinging lever 40. A contact member 41 formed at the leading end of the swinging lever 40 is in engagement with the circumferential groove of the cylindrical member 36 fixed to the swinging shaft 25. Therefore, when the ATC driving shaft 18 rotates, the swinging lever 40 swings. As a result, the swinging shaft 25 and the tool-changing arm (A) fixed to the swinging shaft 25 make one reciprocation in the axial direction of the swinging shaft 25.

As shown in FIG. 2, the tool-changing apparatus TC has a mechanism for extracting the tool (T) used from the main spindle 9. That is, the grooved cam 22 is formed on the upper portion of the peripheral surface of the cylindrical member 39 positioned on the periphery of the ATC driving shaft 18. In order to extract the tool (T) from the main spindle 9, it is possible to allow the tool (T) to be in a releasable state by pressing a tool release pin (not shown) connected with a draw bar (not shown) of a tool installing/removing device of the main spindle 9 by means of the swinging member 42 which follows the rotation of the cylindrical grooved cam 22.

The tool-changing arm (A) swings horizontally to exchange the tool (T) set on the main spindle 9 and that set on the tool magazine 10 with each other. The member which is concerned with this operation is the parallel cam 21 formed at the uppermost position of the ATC driving shaft 18. Because the operation which is performed by the parallel cam 21 is similar to that of the corresponding portion of the apparatus disclosed in U.S. Pat. No. 4,833,772, the operation which is performed by the parallel cam 21 is described below briefly. The parallel cam 21 is a composite cam having plate cams 21a and 21b, thus being in contact with a follower roller 38 formed on the spline auxiliary shaft 37. According to this construction, per rotation of the ATC driving shaft 18, the spline auxiliary shaft 37, the swinging shaft 25, and the tool-changing arm (A) rotate 180°.

Figure 7A:
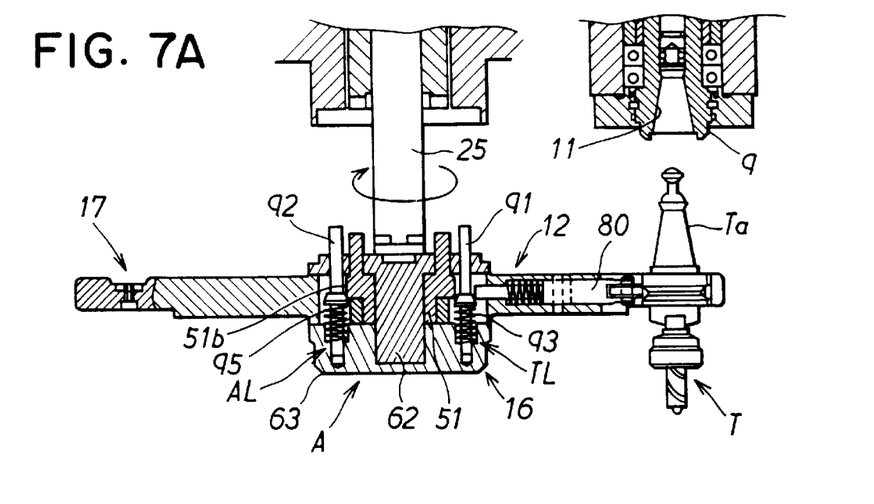
FIGS. 7A to 7C are sectional view showing an operation of an arm-locking mechanism and a tool-locking mechanism of the embodiment.
Figure 7B:
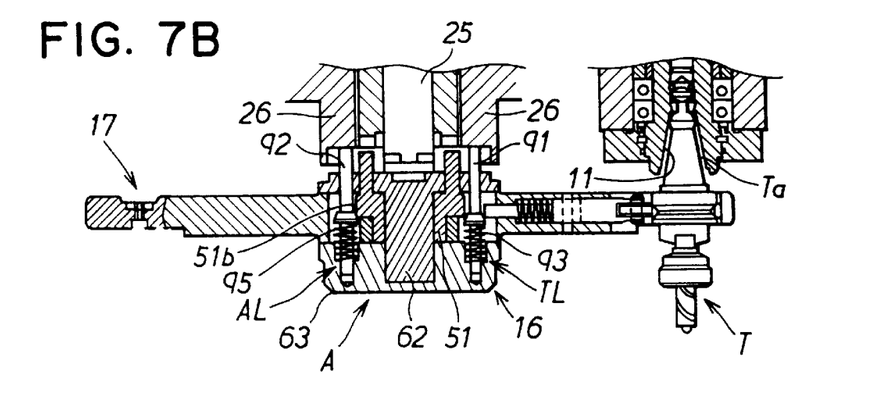
Figure 7C:
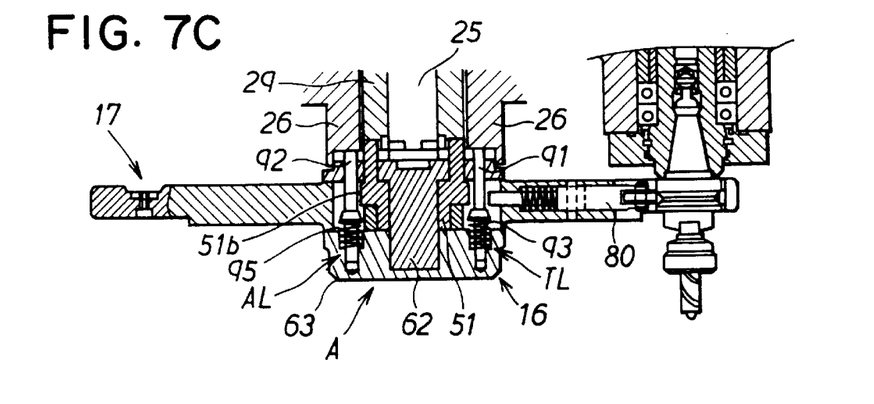

As shown in FIGS. 7A to 7C, the known collet method is adopted to insert the tool (T) having an arbor Ta having a tapered shank formed thereon and gripped by the tool-gripping portion 17 of the arm body 12 into the tool-mounting portion 11 positioned at the lower end of the main spindle 9 and lock it thereto. The tool-mounting portion 11 has a generally conical opening allowing the arbor Ta to be inserted thereinto, with the arbor Ta in close contact therewith.

In a state shown in FIG. 7A shows a state in which the tool-changing arm (A) has moved downward, because the upper end of the tool-locking pin 91 and that of the arm-locking pin 92 are free, the tool-locking pin 91 and the arm-locking pin 92 are pressed upward by the urging force of the springs 93 and 95, respectively. Consequently, the tool-locking mechanism TL and the arm-locking mechanism AL become operative. That is, simultaneously with an upward movement of the tool-locking pin 91, the tapered surface thereof presses one end of the roller shaft 80 projecting from the through-hole 55 of the swinging arm 52, thus preventing the sliding movement of the roller shaft 80 toward the through-hole 55. Simultaneously with an upward movement of the arm-locking pin 92, the tapered surface thereof fits in the circular groove 51b (FIG. 5) formed on the peripheral surface of the arm rotation shaft 51, thus preventing the rotation of the arm body 12 relative to the arm-supporting member 16. The tool (T) gripped by the tool-locking mechanism TL is firmly locked to the gripping portion, and the arm-locking mechanism AL allows the arm body 12 and the arm-supporting member 16 to operate together, i.e., the arm-locking mechanism AL allows the arm body 12 and the swinging shaft 25 to operate together. In this state, the tool-changing arm (A) swings 180°, thus changing the positions of the tools (T) each other.

Then, the tool-changing arm (A) moves upward as shown in FIG. 7B. As a result, the upper end surface of the tool-locking pin 91 and that of the arm-locking pin 92 contact the lower surface of the lower mechanical frame 26. The timing of the contact therebetween, namely, the tool-locking mechanism TL and the arm-locking mechanism AL become inoperative when the arbor Ta of the tool (T) has been inserted in a predetermined depth into the tool-mounting portion 11. That is, before the arbor Ta of the tool (T) is locked to the tool-mounting portion 11, the tool-locking mechanism TL and the arm-locking mechanism AL become inoperative.

That is, the upper end surface of the tool-locking pin 91 and that of the arm-locking pin 92 are pressed to the lower surface of the lower mechanical frame 26. Thus the tool-locking pin 91 and the arm-locking pin 92 are pressed downward against the urging force of the springs 93 and 95, respectively. Consequently, the tool-locking mechanism TL and the arm-locking mechanism AL become inoperative. That is, simultaneously with a downward movement of the tool-locking, pin 91, the tapered surface of the tool-locking pin 91 and one end of the roller shaft 80 projecting from the through-hole 55 of the swinging arm 52 disengage from each other as shown in FIG. 7C, thus allowing the sliding movement of the roller shaft 80 toward the through-hole 55. Simultaneously with a downward movement of the arm-locking pin 92, the fitting of the tapered surface of the arm-locking pin 92 in the circular groove 51b (FIG. 5) formed on the peripheral surface of the arm rotation shaft 51 is released, thus allowing the rotation of the arm body 12 relative to the arm-supporting member 16.

When the arm-locking mechanism AL becomes inoperative, the arm body 12 is swingable on the axis of the swinging shaft 25, independently of the operation of the swinging shaft 25. Thus, the arm body 12 swings according to the motion of the tool (T) which is inserted into the tool-mounting portion 11 of the main spindle 9 along the tapered surface of the tool-mounting portion 11.

In the state shown in FIG. 7C, the tool-changing arm (A) is located at the top dead center. Owing to the rotation of the external gear 29 in this state, the reciprocating swinging motion of the arm body 12 between the arm-waiting position and the tool-changing position is accomplished, independently of the operation of the swinging shaft 25.

In the above tool-gripping mechanism, the tool-locking mechanism TL and the arm-locking mechanism AL are made operative due to the downward movement of the tool-changing arm (A) and inoperative due to the upward movement thereof. Further, using the mechanism having a simple construction, the rotational motion of the ATC driving shaft 18 is converted into the reciprocating swinging motion of the arm body 12 between the arm-waiting position and the tool-changing position through the plane grooved cam 24 and the external gear 29 so as to exchange the tool (T) set on the main spindle 9 and that set on the tool magazine 10 with each other. Further, even though the tool (T) is inserted into the tool-mounting portion 11 at a low positioning accuracy, this can be absorbed by the swinging motion of the arm body 12. Therefore, the tool (T) can be installed securely on the tool-mounting portion 11 without applying a load to the tool (T) and the tool-mounting portion 11. Accordingly, the manufacturing cost can be reduced to be lower than that of an apparatus using an expensive roller cam gear and the like capable of allowing the tool (T) to be installed on the tool-mounting portion 11 at high accuracy.

It is to be noted that the present invention is not limited to the above embodiment. For example, instead of a motor used as the driving source in the embodiment, a rotary cylinder or rack/pinion may be used. Although the cam mechanism is used to operate the external gear, other driving sources, for example, an air cylinder or a motor not directly connected with the ATC driving shaft may be used to operate the external gear.

I claim:

1. A tool-changing apparatus for a machine tool comprising:

an arm-supporting member having an arm central shaft;

an arm body supported rotatably around the arm central shaft by the arm-supporting member and having a tool-gripping mechanism formed at both ends thereof, the tool gripping mechanism having a tool-gripping portion and a movable tool-clamping member;

an arm-locking mechanism for locking the arm body to the arm central shaft and unlocking the arm body from the arm central shaft selectively.

2. The tool-changing apparatus as in claim 1, further comprising:

a tool-locking mechanism for selectively locking and unlocking the tool-clamping member.

3. The tool-changing apparatus as in claim 1, further comprising:

an arm-swinging shaft extending along an axis of the arm central shaft and operatively connected to the arm body to transmit a driving force of a driving shaft of a machine tool to the tool-gripping mechanism so that a tool set on a main spindle of the machine tool and a tool set on a tool magazine of the machine tool are changed with each other by utilizing tool-gripping of the tool-gripping mechanism and a swinging motion of the arm body and an upward and downward movement of the arm body; and an arm-lock operating mechanism for operating the arm-locking mechanism by means of an upward and downward movement of an arm-locking pin urged by a spring, according to an upward and downward movement of the arm body.

4. The tool-changing apparatus as in claim 3, further comprising:

an annular external gear positioned on an outer periphery of the arm-swinging shaft and having a lower end that is engageable with an upper end of the arm body to transmit the driving force of the driving shaft to the arm body and impart a reciprocating swinging motion to the arm body.

5. The tool-changing apparatus as in claim 2, further comprising:

an arm-swinging shaft extending along an axis of the arm central shaft and operatively connected to the arm body to transmit a driving force of a driving shaft of a machine tool to the tool-gripping mechanism so that a tool set on a main spindle of the machine tool and a tool set on a tool magazine of the machine tool are changed with each other by utilizing tool-gripping of the tool-gripping mechanism and a swinging motion of the arm body and an upward and downward movement of the arm body; and a tool-lock operating mechanism for operating the tool-locking mechanism by means of an upward and downward movement of a tool-locking pin urged by a spring, according to an upward and downward movement of the arm body.

6. The tool-changing apparatus as in claim 5, further comprising:

an annular external gear positioned on an outer periphery of the arm-swinging shaft and having a lower end that is engageable with an upper end of the arm body to transmit the driving force of the driving shaft to the arm body and impart a reciprocating swinging motion to the arm body.

7. A tool-changing apparatus for a machine tool having a main spindle with a tool-mounting portion, comprising:

a swinging shaft that rotates and moves vertically;

a tool-changing arm body having a tool-gripping portion at at least one end thereof and held rotatably around an axis of the swinging shaft to fit a tool gripped by the tool-gripping portion in a tool-mounting portion of the main spindle and takes out the tool from the tool-mounting portion in response to a rotation and a vertical movement of the swinging shaft;

an arm-locking mechanism for locking the arm body to the swinging shaft; and a locking/unlocking control mechanism for controlling locking and unlocking between the arm body and the swinging shaft by the arm-locking mechanism, the control mechanism controlling the arm-locking mechanism to be inoperative when the tool is inserted into the tool-mounting portion in a predetermined depth.

8. The tool-changing apparatus according to claim 7, wherein each of the tool and the tool-mounting portion has a tapered surface so that the tool is inserted into the tool-mounting portion and fitted therein along the tapered surfaces.

9. A tool-changing method for a machine tool by moving, around or along an axis of a swinging shaft, a tool-changing arm body having a tool-gripping portion at at least one end thereof to insert a tool gripped by the tool-gripping portion into a tool-mounting portion of a main spindle and fit the tool therein and take out the tool from the tool-mounting portion, the tool changing method comprising the steps of:

operating an arm-locking mechanism for locking the arm body to the swinging shaft;

inserting the gripped tool into the tool-mounting portion in a predetermined depth;

preventing the arm-locking mechanism to operate so that the arm body is movable around the axis of the swinging shaft independently of the swinging shaft when the tool is inserted into the tool-mounting portion in the predetermined depth; and inserting the tool into the tool-mounting portion and fitting the tool therein by utilizing an independent movement of the arm body around the axis of the swinging shaft.

10. The tool-changing method according to claim 9, wherein each of the tool and the tool-mounting portion has a tapered surface so that the tool is inserted into the tool-mounting portion and fitted therein along the tapered surfaces.

11. A tool-changing apparatus for a machine tool having a main spindle for holding a tool and a tool magazine for storing tools, the apparatus comprising:

a swinging shaft held rotatably around an axis thereof and movably along the axis thereof;

an arm body operatively coupled with the swinging shaft and held perpendicularly to the axis of the swinging shaft, the arm body having a tool gripping portion at an end thereof;

a clamping member held movably in the arm body for clamping the tool in the gripping portion and biased by a spring in a direction perpendicular to the axis of the swinging shaft;

an arm-locking pin movably held and biased by a spring in a direction perpendicular to the arm body, the arm-locking pin having a flange engageable with the arm body to lock and unlock the arm body relative to the swinging shaft in response to the movement of the swinging shaft along the axis of the swinging shaft; and a tool-locking pin movably held in the arm body and biased by a spring in the direction perpendicular to the arm body, the tool-locking pin having a flange engageable with the clamping member to lock and unlock the tool in the gripping portion in response to the movement of the swinging shaft along the axis of the swinging shaft.

* * * * *